(12) United States Patent
Fang

(10) Patent No.: US 6,525,503 B2
(45) Date of Patent: Feb. 25, 2003

(54) DRIVE MECHANISM OF SCANNER

(75) Inventor: Po-Hua Fang, Taipei (TW)

(73) Assignee: Umax Data Systems Inc. (TW)

( * ) Notice: Subject to any disclaimer, the term of this patent is extended or adjusted under 35 U.S.C. 154(b) by 37 days.

(21) Appl. No.: 09/740,484

(22) Filed: Dec. 19, 2000

(65) Prior Publication Data

US 2002/0005703 A1 Jan. 17, 2002

(30) Foreign Application Priority Data

Jul. 7, 2000 (TW) .................................... 089211695 U

(51) Int. Cl.[7] .................................................. G06G 3/00
(52) U.S. Cl. ......................................... 318/637; 318/15
(58) Field of Search ................................. 318/1, 11, 14, 318/15, 637; 74/89.2–89.22

(56) References Cited

U.S. PATENT DOCUMENTS 3,586,259 A * 6/1971 Richt
5,737,216 A * 4/1998 Hokari
6,134,978 A * 10/2000 Lin

* cited by examiner

Primary Examiner—Jeffrey Donels

(57) ABSTRACT

A drive mechanism for a scanner includes a delivery device, a first rotational speed motor and a second rotational speed motor. The delivery device consists of an actuating wheel, a passive wheel and a conveyor belt. The conveyor belt is carried by the actuating wheel and the passive wheel, and the axes of the passive wheels are attached to two ends of the inner side diameter of the actuating wheel. The output shaft of the first rotational speed motor is provided with an actuating skew gear that engages two passive skew gears. The output shaft of the second rotational speed motor is also provided with an actuating skew gear that engages two passive skew gears. The drive mechanism uses the two motors to drive the two passive skew gears so as to better control the rotational speed and to scan the document image.

10 Claims, 4 Drawing Sheets

DRIVE MECHANISM OF SCANNER

BACKGROUND OF THE INVENTION

1. Field of the Invention

This invention relates to the drive mechanism for a scanner.

2. Background of the Invention

A scanner is a common computer peripheral equipment which uses an internal image pick-up device to pick up document images and to transfer the pick-up image into digital signals as input to a computer which then performs image processing of the document.

FIG. 1A is a diagram showing a conventional scanner 1. The conventional scanner 1 comprises a housing 12 with an upper opening 11, a document 13 to be scanned, and an image pick-up device 14. The document 13 can be placed above the upper opening 11 of the housing 12, and the image pick-up device 14 scans the image by a drive mechanism (not shown) provided by the scanner 1, with the image pick-up device 14 being an optical path device of Charged Couple Device (CCD) or Contact Image Sensor (CIS).

FIG. 1B illustrates the drive mechanism 2 of the conventional scanner 1. The drive mechanism 2 is mounted in the housing 12 and positioned below the document 13, and comprises a scanning path 21, a delivery device 22, and a set of decelerated gears and a motor 24.

The scanning path 21 consists of a slip bar 211 and a sliding rail 212, with the slip bar 211 and the sliding rail 212 parallel each other, and with the image pick-up device 14 having a guide hole 141 and rotating wheel 142 that cooperate with slip bar 211 and sliding rail 212, respectively, so as to scan back and forth in the scan path 21.

The delivery device 22 comprises an actuating gear 221, a passive gear 222 and an annular gear belt 223, with the actuating gear 221 and the passive gear 222 mounted in the two ends of the housing 12 respectively, the annular gear belt 223 being set on the two gears 221, 222 respectively and parallel with scan path 21, and with the annular gear belt 223 combining with the image pick-up device 14.

A reduction gear set 23 is combined with the motor 24 and the actuating gear 221, and its primary function is to provide appropriate reduction ratio so that rotational speed (torque) of the motor 24 is reduced to an appropriate extent and then to communicate motive power to the actuating gear 221.

Thus the scanning mode of the drive mechanism 2 is to promote the rotation of the delivery device 22 by way of output power of the motor 24 so that the annular gear belt 223 drives the image pick-up device 14 to move back and forth in the scan path 21 so as to scan the document 13.

However there are many design problems with the conventional scanner 1. Since current consumers not only demand to increase the resolution of the scanner 1, they also demand that scanning speed be as fast as possible. However, if the resolution of the scanner 1 is increased, the speed of image processing becomes slow, which then requires adjusting the reduction ratio of the reduction gear set 23 or adopting higher rotational speed of the motor 24 so as to increase the scanning speed of the scanner 1.

Unfortunately, all motors, whether DC motor or stepping motor, have defined specifications and rotational speed (torque) range limits, so little can be done to increase the rotational speed of the motor 24. Hence increase in the speed of image processing is typically achieved by changing the reduction ratio of the reduction gear set 23. However, even changing the reduction ratio of the reduction gear set 23 may not be enough.

SUMMARY OF THE INVENTION

It is an objective of the present invention to provide a drive mechanism for a scanner. The drive mechanism provides wider scope of scanning speed for a scanner and is matched with the scanning speed design of the scanner that has various resolutions.

The drive mechanism according to the present invention comprises a delivery device, two passive skew gears, a first rotational speed motor and a second rotational speed motor. The delivery device consists of an actuating wheel, a passive wheel and an annular conveyor belt, with the conveyor belt carried by the actuating wheel and the passive wheel. The axes of the two passive skew gears are attached to two ends of the inside diameter of the actuating wheel. The output shaft of the first rotational speed motor is provided with an actuating skew gear that engages the two passive skew gears. The output shaft of the second rotational speed motor is provided with an actuating skew gear that engages the two passive skew gears. The drive mechanism uses the two motors to drive the two passive skew gears so as to better control the rotational speed and to scan the document image.

The two passive skew gears and two actuating wheels of two motors form a differential gear. Because the axes of two passive skew gears are attached to two ends of the inside diameter of the actuating wheel, averaging the sum of the first motor rotational speed and the second motor rotational speed will provide the rotational speed of the actuating wheel. Hence the motors of two different rotational speeds are used to mutually coordinate and obtain a particular or more appropriate rotational speed value for the actuating wheel.

DESCRIPTION OF THE PREFERRED EMBODIMENTS

Figure 1A:
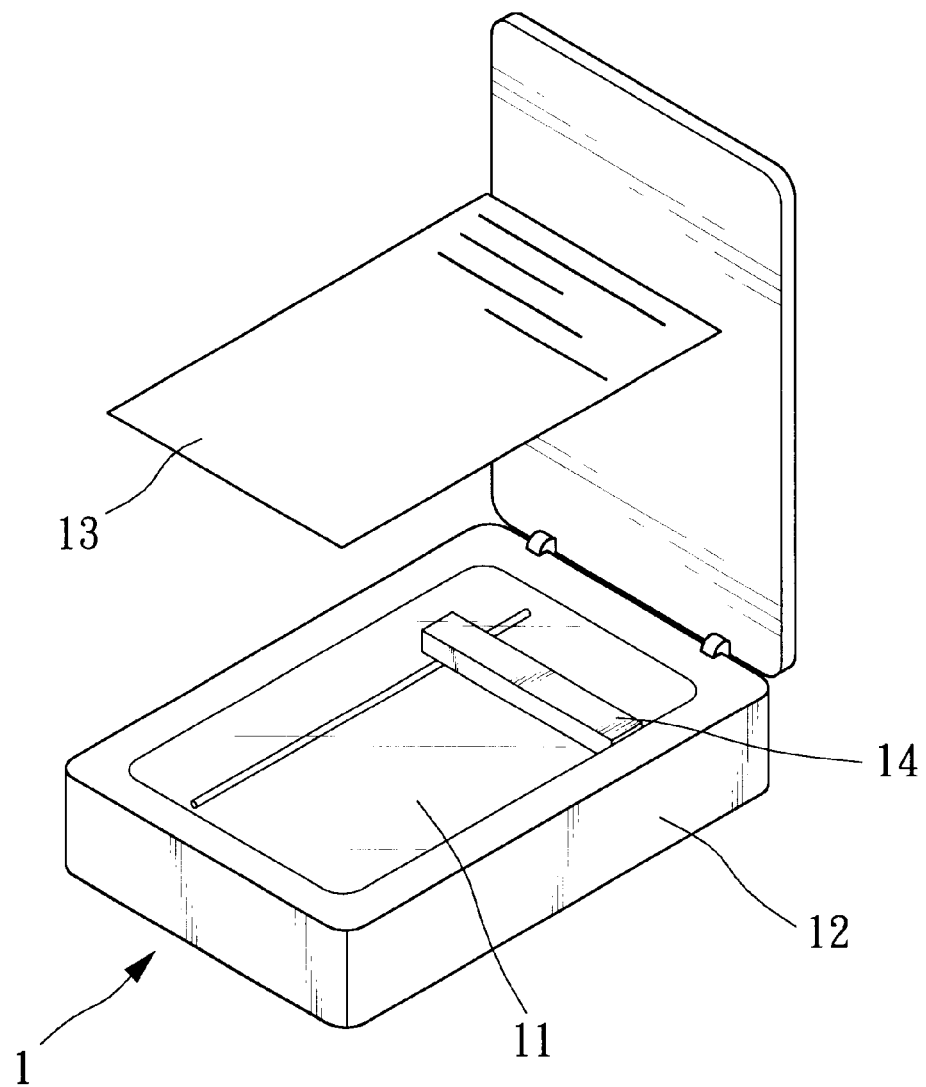
FIG. 1A illustrates a conventional scanner.
Figure 1B:
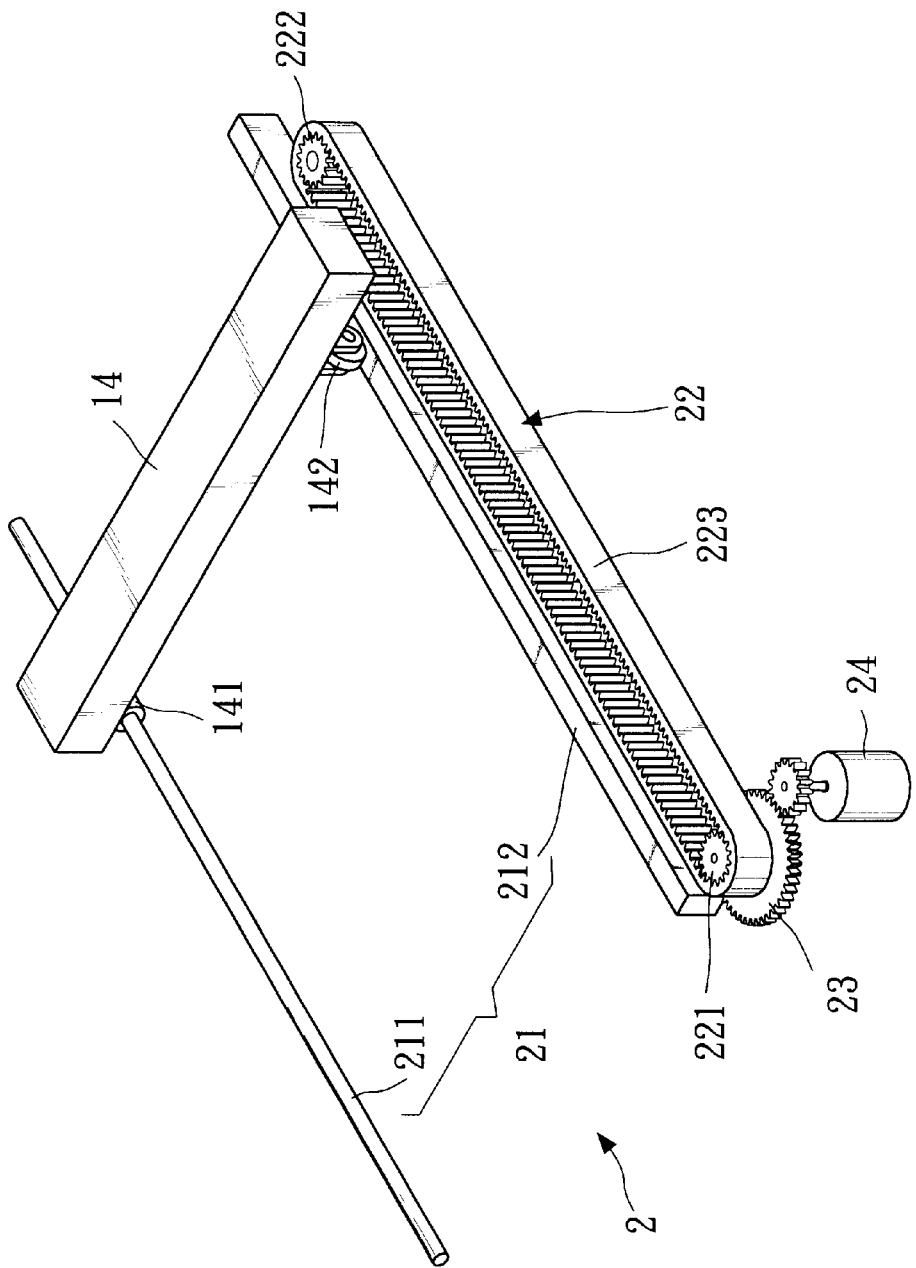
FIG. 1B illustrates a drive mechanism for the scanner of FIG. 1.
Figure 2:
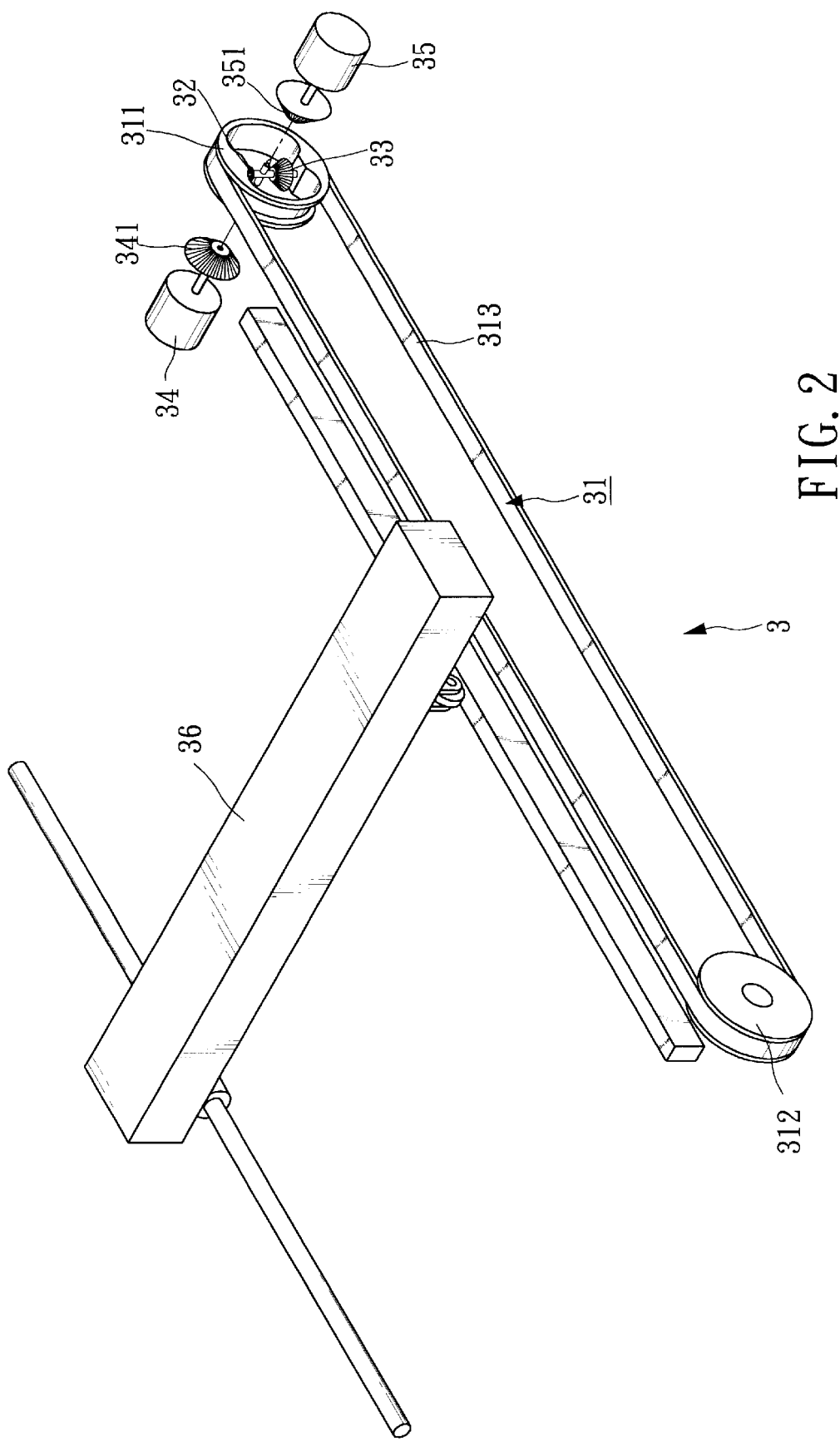
FIG. 2 is an exploded perspective view of the drive mechanism according the present invention.

FIG. 2 illustrates the drive mechanism 3 according to the present invention, with the drive mechanism 3 having a delivery device 31, two passive skew gears 32, 33, a first rotational speed motor 34 and a second rotational speed motor 35.

The delivery device 31, which is used to drive the image pick-up device 36 that moves back and forth in the scanner in order to scan images, has an actuating wheel 311, passive wheel 312 and an annular conveyor belt 313. The annular conveyor belt 313 is carried by the actuating wheel 311 and a passive wheel 312, with the two passive skew gears 32, 33 attached to two ends of the inside diameter of the actuating wheel 311. The actuating wheel 311 and the passive wheel 312 may be a fixed pulley or gear, and the annular conveyor belt 313 may be an annular rope sheave or annular gear.

The first rotational speed motor 34 is fixed within the scanner and its output shaft is perpendicular to the wheel face of the actuating wheel 311. The first rotational speed motor 34 has an actuating skew gear 341 that engages with the passive skew gears 32, 33. The second rotational speed motor 35 is fixed within the scanner and its output shaft is perpendicular to the wheel face of the actuating wheel 311. The second rotational speed motor 35 has an actuating skew gear 351 that engages with the passive skew gears 32, 33. The two motors 34 and 35 may be a DC motor or stepping motor.

Figure 3:
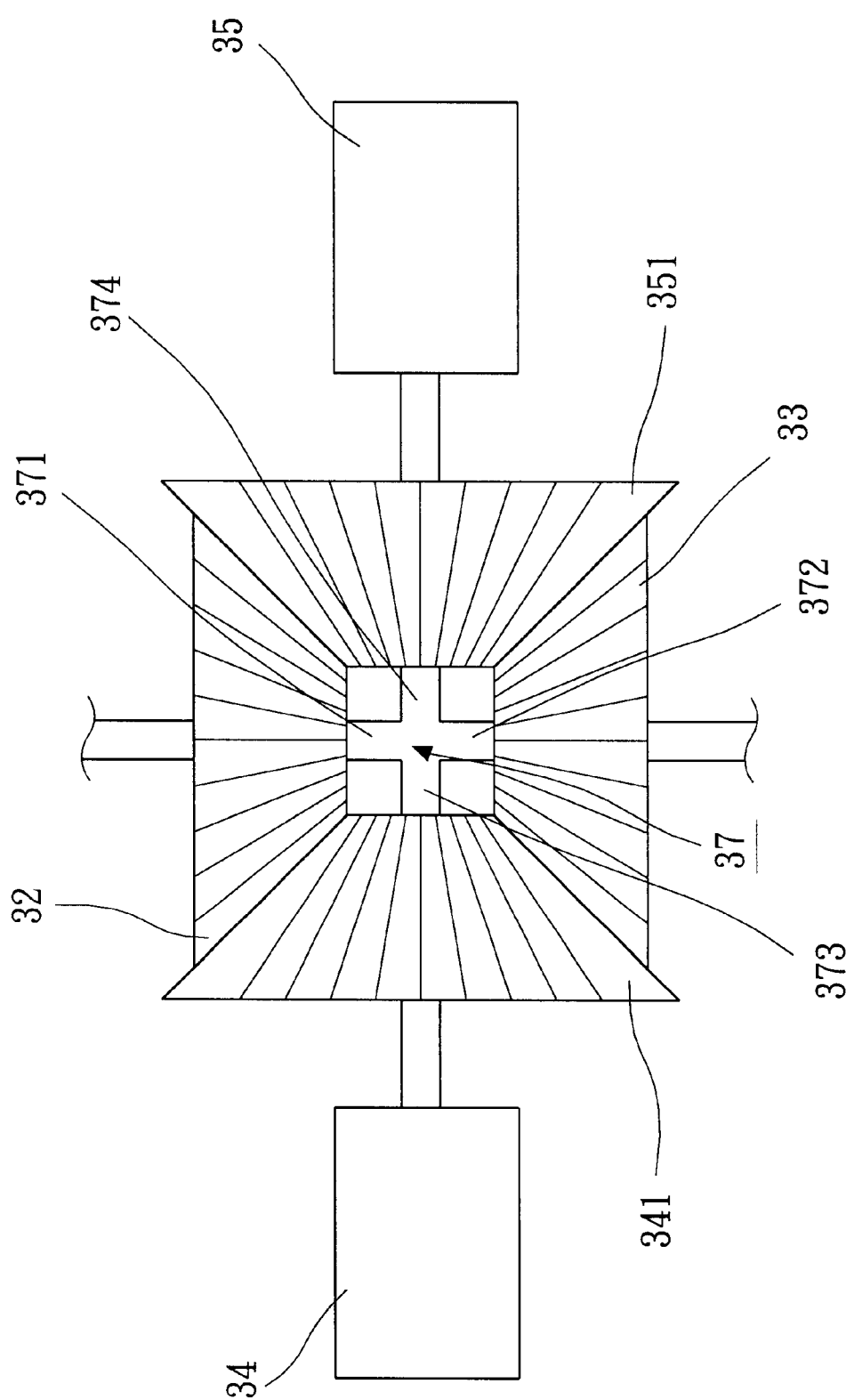
FIG. 3 is a partial diagram of the drive mechanism according to the present invention.

Referring now to FIG. 3, to promote steady engagement between the two passive skew gears 32, 33 and the two motors 34, 35, the present invention further comprises a cross fixing stand 37, which is set between the two passive skew gears 32, 33 and the two actuating skew gears 341, 351. The fixing stand 37 is provided with four support bars that are mutually perpendicular, with two support bars 371, 372 fixedly connected to the axes of the two passive skew gears 32, 33 respectively and the other support bars 373, 374 pivotally connected to the axes of the two actuating skew gears 341, 351.

The two passive skew gears 32, 33 and the two actuating skew gears 341, 351 engage mutually and form a mechanism that is similar to the differential gear of a conventional automobile, with the features of the differential gear described as follow:

a. The rotational speed of the first rotational speed motor 34 is defined as $w_1$.

b. The rotational speed of the second rotational speed motor 35 is defined as $w_2$.

c. The rotational speed of the actuating wheel 311 is defined as w.

Thus the rotational speed of the actuating wheel 311 can be expressed as half of the sum of the rotational speed of the first rotational speed motor 34 and the second rotational speed motor 34, that is, $w=(w_1+w_2)/2$.

Thus, the drive mechanism of the present invention can create particular or appropriate rotational speed values for the actuating wheel 311 by controlling the mutual speeds of the first rotational speed motor 34 and the second rotational speed motor 35 so as to provide the required scan speed for the scanner under various resolutions. The two motors 34 and 35 can be controlled and adjusted to provide consistent speed output.

Although the present invention has been described in connection with the preferred embodiments, it will be appreciated by those skilled in the art that modifications can be made and alternatives utilized without departing from the spirit and scope of the present invention.

What is claimed is:

1. A drive mechanism for a scanner, comprising:
   a delivery device having an actuating wheel, a passive wheel, and a conveyor belt, with the conveyor belt coupling the actuating wheel and the passive wheel;
   two passive skew gears that are attached to the actuating wheel;
   a first rotational speed motor having an output shaft that carries an actuating skew gear that engages the passive skew gears; and
   a second rotational speed motor having an output shaft that carries an actuating skew gear that engages the passive skew gears.

2. The mechanism of claim 1, further including a cross fixing stand that has four mutually perpendicular support bars, with two of the support bars being fixedly connected to the axes of the two passive skew gears, and the other two support bars being pivotally connected to the axes of the two actuating skew gears.

3. The mechanism of claim 1, further including an image pick-up device that is connected to the conveyor belt.

4. The mechanism of claim 1, wherein the actuating wheel and the passive wheel are fixed pulleys, and the conveyor belt is an annular belt.

5. The mechanism of claim 1, wherein the actuating wheel and passive wheel are gears, the conveyor belt is an annular gear belt.

6. The mechanism of claim 1, wherein the first rotational speed motor and second rotational speed motor are stepping motors.

7. The mechanism of claim 1, wherein the first rotational speed motor and second rotational speed motor are direct current motors.

8. The mechanism of claim 3, wherein the image pick-up device is an optical path device having a charge-coupled device.

9. The mechanism of claim 3, wherein the image pick-up device is a contact image sensor.

10. The mechanism of claim 1, wherein the rotational speed of the actuating wheel is the average of the sum of the rortational speeds of the first and second motors.

* * * * *